United States Patent [19]
Sarangapani

[11] Patent Number: 5,987,976
[45] Date of Patent: Nov. 23, 1999

[54] METHOD FOR DETERMINING THE CONDITION OF ENGINE OIL BASED ON TBN MODELING

[75] Inventor: Jagannathan Sarangapani, Peoria, Ill.

[73] Assignee: Caterpillar Inc., Peoria, Ill.

[21] Appl. No.: 09/041,557

[22] Filed: Mar. 12, 1998

[51] Int. Cl.[6] .................................................. F01M 11/10
[52] U.S. Cl. ........................... 73/117.2; 73/113; 340/438; 340/450.3; 340/457.4; 701/1; 701/123
[58] Field of Search ........................... 73/113, 116, 117.2, 73/117.3; 340/438, 450.3, 457.4; 701/1, 123

[56] References Cited

U.S. PATENT DOCUMENTS

| | | | |
|---|---|---|---|
| 4,506,337 | 3/1985 | Yasuhara | 73/117.3 |
| 4,706,193 | 11/1987 | Imajo et al. | 364/424 |
| 4,796,204 | 1/1989 | Inoue | 73/117.3 |
| 4,862,393 | 8/1989 | Reid et al. | 364/550 |
| 5,043,697 | 8/1991 | Ayabe et al. | 340/457.4 |
| 5,382,942 | 1/1995 | Raffa et al. | 340/457.4 |
| 5,523,692 | 6/1996 | Kuroyanagi et al. | 324/438 |
| 5,750,887 | 5/1998 | Schricker | 73/117.3 |

OTHER PUBLICATIONS

ASN 8/749,603 filed Nov. 18, 1996 (Docket No. 95–401) David R. Schricker.
ASN 8/961,445 filed Oct. 30, 1997 (Docket No. 97–503) Jagannathan Sarangapani, et al.
SAE Paper—1987 #870403 Development of an Automatic Engine Oil–Change Indicator System (Feb. 23–27, 1987).

*Primary Examiner*—Eric S. McCall
*Attorney, Agent, or Firm*—Steve D. Lundquist

[57] ABSTRACT

A method for monitoring the condition of oil in an engine is disclosed which includes the steps of determining a plurality of parameters, determining a fuel injection model, determining the area of the cylinder walls that is coated with fuel, and responsively determining a total base number (TBN) model. The TBN determined from the model may be trended over time to predict the useful life of the oil.

25 Claims, 4 Drawing Sheets

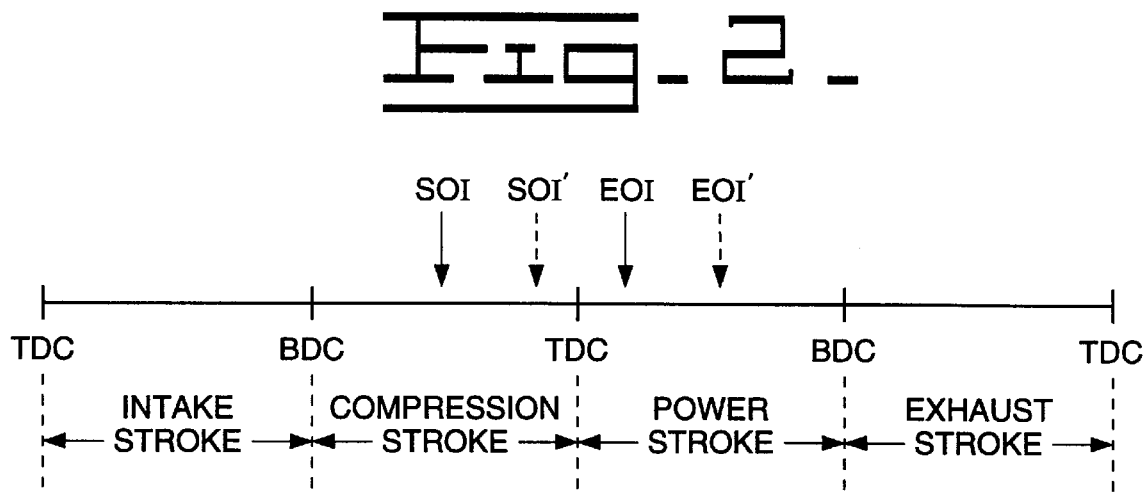
Fig_2_
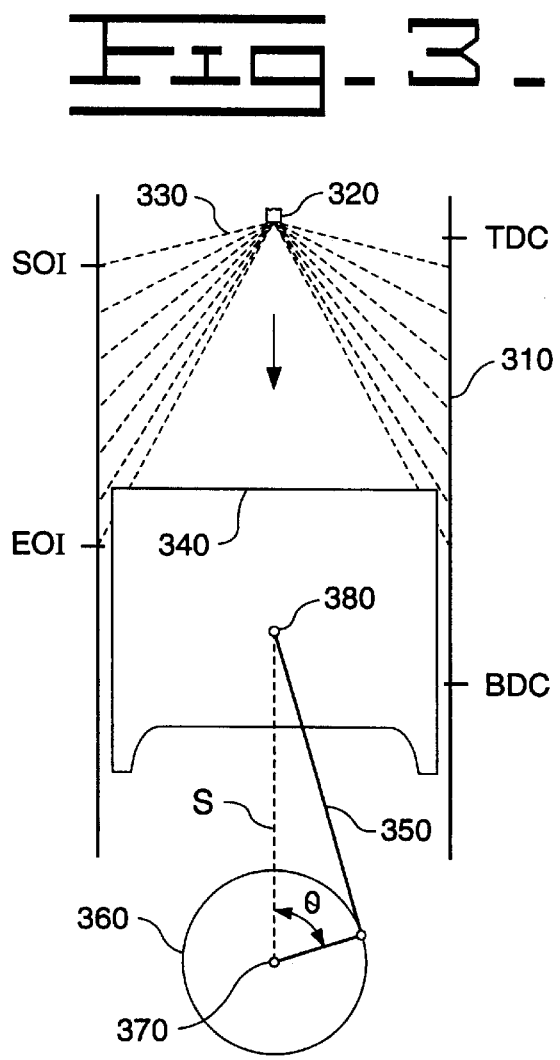
Fig_3_

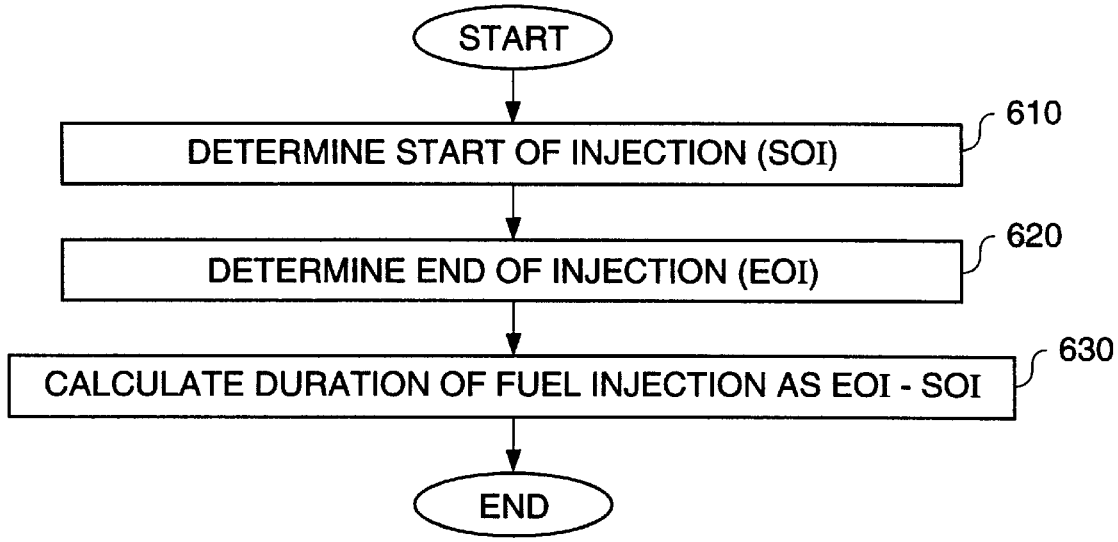
Fig_6_

5,987,976

METHOD FOR DETERMINING THE CONDITION OF ENGINE OIL BASED ON TBN MODELING

TECHNICAL FIELD

This invention relates generally to a method for determining the condition of engine oil and, more particularly, to a method for modeling the total base number (TBN) of the engine oil and responsively determining the condition of the oil.

BACKGROUND ART

Engines are required to operate under increasingly demanding conditions. The loads applied to the engine, and the harshness of the surrounding environment, place a great amount of stress on an engine. Therefore, consistent monitoring of the condition of the oil is increasingly important.

Currently, the condition of engine oil, i.e., when the useful life of the oil has ended, is estimated by monitoring the length of time the oil is in use, and modifying the estimate by accounting for the conditions under which the engine operates. The estimate is used to determine the interval, in time or mileage, between oil changes. However, the condition of the oil at any given time cannot be determined by this method.

In addition, the estimate may not accurately determine the useful life of the oil. Therefore, the oil may be changed too frequently, which adds unnecessary maintenance costs, or not frequently enough, which causes undue wear on the engine.

During combustion of fuel in an engine, some by-products of the fuel are deposited during each combustion cycle on the walls of each cylinder in an engine. One of these by-products, sulfur, combines with water and oxygen to form sulfuric acid. The rings on the pistons then wipe this sulfuric acid and additional sulfur off the cylinder walls and deposits these products into the oil that lies in the crankcase of the engine. The sulfur and sulfuric acid products reduce the total base number of the oil (TBN).

The TBN of the oil is a direct indicator of oil condition. For example, new oil may have a desired TBN of 10. As sulfuric acid is added to the oil, the TBN will decrease toward zero (and even become a negative number if the oil be allowed to become acidic). The TBN depletion of engine oil enables the acids in the oil to attack the metal linings of the engine, thus causing corrosion. The ability to monitor the TBN of the oil can help determine when the oil is nearing the end of its useful life.

The present invention is directed to overcoming one or more of the problems as set forth above.

DISCLOSURE OF THE INVENTION

In one aspect of the present invention a method for determining the condition of oil in an engine is disclosed. The method includes the steps of determining a plurality of parameters, determining a model of the duration of injection of fuel into a cylinder, determining a wall area of the cylinder that is coated with fuel, and determining a model of the total base number (TBN) of the oil as a function of the parameters and the coated wall area.

In another aspect of the present invention a model for determining the condition of oil in an engine is disclosed. The model includes a fuel injection duration model for determining a duration of injection of fuel into a cylinder in the engine, and a crank model for determining the area exposed to injection of fuel in an inner wall of the cylinder. The model also includes a total base number (TBN) model for receiving the data from the crank model and for receiving a plurality of parameters associated with the engine, responsively determining the TBN of the oil, and responsively determining the condition of the oil.

BRIEF DESCRIPTION OF THE DRAWINGS

FIG. 2 is a time line illustrating a cycle of operation of an internal combustion engine;

FIG. 3 is a diagrammatic view illustrating fuel being applied to the wall of a cylinder;

FIG. 6 is a flow diagram of a method of the present invention that determines the duration of fuel injection.

BEST MODE FOR CARRYING OUT THE INVENTION

The present invention is directed towards a method for determining the condition of oil in an internal combustion engine using a model of the total base number (TBN) of the oil to monitor the condition of the oil.

Figure 1:
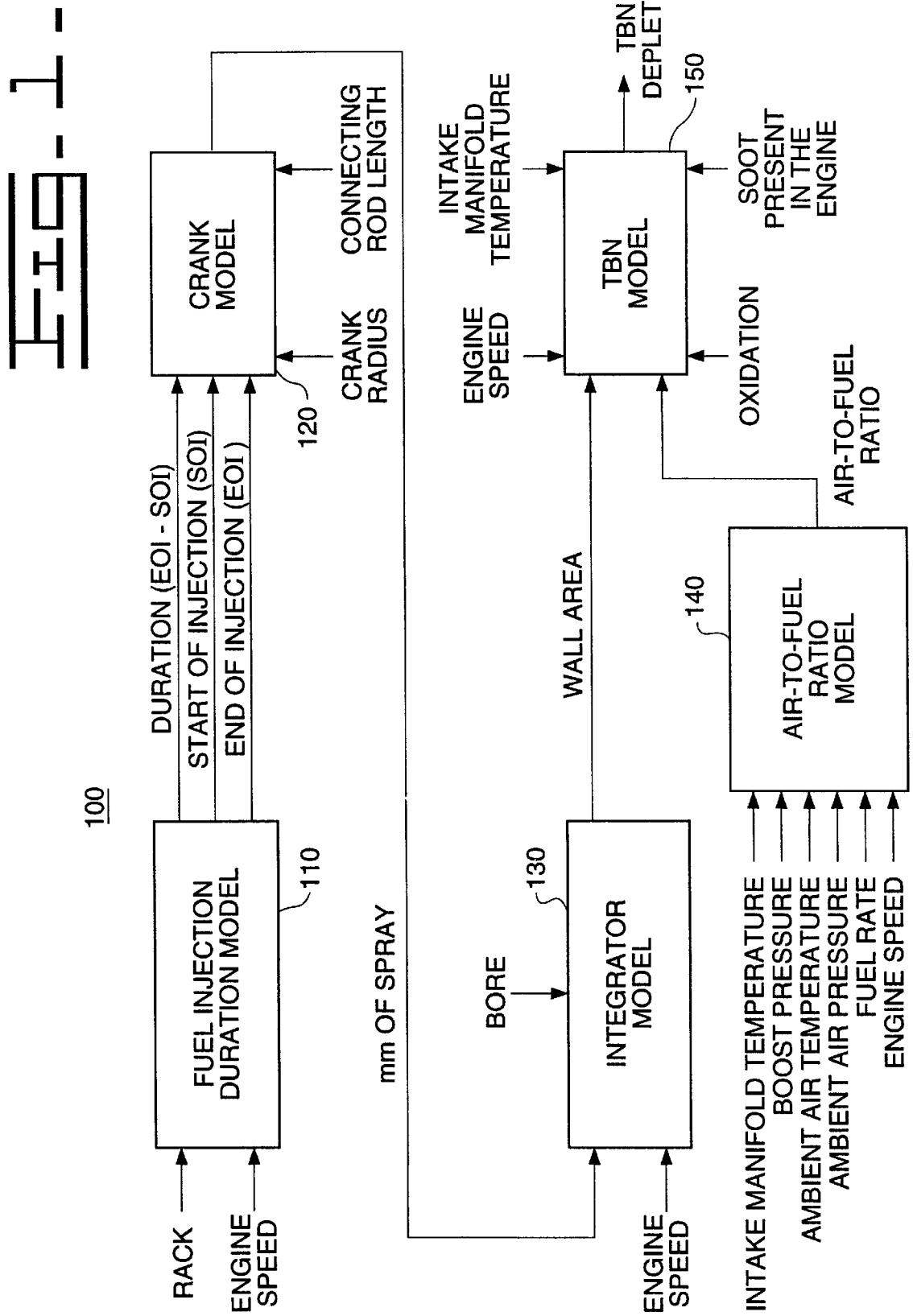
FIG. 1 is a block diagram illustrating an embodiment of the present invention.

With particular reference to FIG. 1, a block diagram of a model 100 to determine the TBN is shown The model 100 includes several specific models, which are described in detail below.

A plurality of parameters are received by the model 100. Parameters may be sensed directly, calculated from other parameters, or determined by other models that are not part of the present invention. Examples of parameters include, but are not limited to: fuel rack position, engine speed, ambient air temperature, ambient air pressure, intake manifold temperature, boost pressure, fuel rate, and air-to-fuel ratio.

A fuel injection duration model 110 receives data defining the fuel rack position and the engine speed, and responsively determines the start of injection (SOI) and the end of injection (EOI). The fuel injection duration model then calculates the duration of fuel injection into the cylinder as the difference in time between the start of injection and the end of injection (EOI-SOI).

Referring to FIG. 2, a timeline of one complete cycle of an internal combustion engine is shown. The cycle has four stages; an intake stroke, a compression stroke, a power stroke, and an exhaust stroke. During the intake stroke, a piston in the cylinder moves from a position near top dead center (TDC) to near bottom dead center (BDC). During the compression stroke, the piston moves from BDC to TDC. During the power stroke, the piston moves from TDC to BDC. During the exhaust stroke, the piston moves from BDC to TDC.

The timeline of FIG. 2 shows SOI occurring at a time prior to TDC before the power stroke. EOI occurs at a time after TDC during the power stroke. During this time interval, fuel is being injected into the cylinder. As the fuel is injected, the momentum of the fuel spray carries by-products of the fuel, such as sulfur, to the walls of the cylinder, where the temperature is cooler than in the open chamber of the cylinder. This deposited sulfur is wiped by piston rings from the walls of the cylinder into the crankcase oil. The sulfur combines with water and oxygen in the oil to form sulfuric acid.

An alternate start of injection (SOI') and end of injection (EOI') is shown in FIG. 2 as being delayed in time from the original SOI and EOI. This illustrates a preferred timing method used in engines to meet emissions standards. However, the additional time that the duration of injection exists during the power stroke results in greater exposure of the cylinder walls to fuel spray. This results in greater amounts of sulfur being deposited in the cylinder and wiped into the oil, thereby reducing the useful life of the oil.

The amount of sulfur deposited in the engine crankcase is proportional to the area of the cylinder wall that is exposed to the fuel spray during injection. Referring to FIGS. 1 and 3, a crank model 120 is shown which provides the information needed to determine the wall area.

In FIG. 3, a piston 340 is shown that reciprocates within a cylinder wall 310. A fuel injector nozzle 320 delivers a fuel spray 330 onto the cylinder wall 310 from SOI to EOI. As the piston 340 moves, the area of the cylinder wall 310 changes in value.

The piston 340 is connected to and driven by a crankshaft 360 via a connecting rod 350. The connecting rod 350 is connected to the piston 340 by a pin at a piston pin axis 380 and is connected to the crankshaft 360 by a pin at the crank axis 370.

The distance (s) from the crank axis to the piston pin axis can be used to determine the height (h) of the cylinder wall 310 that is exposed to the fuel spray 330. The distance (s) is determined by:

$$s = a\cos\theta + \sqrt{(l^2 - a^2\sin^2\theta)} \quad \text{(Equation 1)}$$

where a is the radius of the crankshaft 360,

θ is the crank angle, and l is the length of the connecting rod 350.

The wall area (WA) that is effectively coated with sulfur during injection can be determined as a function of the total area exposed over a period of time by using the following equation:

$$WA_1 = \pi Bh\left(\frac{N}{120}\right)x \quad \text{(Equation 2)}$$

where

B is the bore (diameter) of the piston 340, h is the height of the exposed cylinder wall 310, N is the engine speed, and x is the length of time that the engine has been running.

In Equation 2, no provision is made for the constant movement of the piston 340 as the fuel spray 330 is injected. A preferred method for determining the effective wall area (WA) is to integrate with respect to either crank angle or time from SOI to EOI. This method is performed in an integrator model 130 shown in FIG. 1. A preferred equation for determining WA is:

$$WA_2 = \int_{SOI}^{EOI} \pi Bh\left(\frac{N}{120}\right)xd\theta \quad \text{(Equation 3)}$$

Alternatively, WA can be determined by:

$$WA_3 = \int_{SOI}^{EOI} \pi Bh\left(\frac{N}{120}\right)xdt \quad \text{(Equation 4)}$$

In Equations 3 and 4, the SOI and EOI are correlated to positions on the cylinder wall 310 as functions of the fuel rack position, the engine speed, and the engine geometry.

An air-to-fuel ratio model 140 shown in FIG. 1 is used to determine the air-to-fuel ratio, which is in turn used to determine the amount of sulfur added to the oil. Parameters that are received by the air-to-fuel model 140 include, but are not limited to: intake manifold temperature, boost pressure, ambient air temperature, ambient air pressure, fuel rate, and engine speed.

A TBN model 150 receives the air-to-fuel ratio parameter from the air-to-fuel ratio model 140, and receives the wall area parameter from the integrator model 130. Additionally, the TBN model 150 receives such parameters as the engine speed, intake manifold temperature, oxidation of the oil, and soot present in the engine. Oxidation may be determined from sensors in the oil, such as capacitive sensors, and is used to determine an amount of sulfur that may be converted to sulfuric acid. The soot present in the engine also affects the amount of sulfur that will convert to sulfuric acid. From these parameters, the TBN model 150 determines the TBN of the engine oil, which is used to determine a value of TBN depletion over time.

The above description determines the TBN of the engine oil during a cycle of the engine. In the preferred embodiment, to determine the TBN depletion of the oil, the TBN is determined by determining an incremental value of TBN for one cycle of the engine, subtracting the incremental TBN from the previous determination of TBN, and adding an adjusted TBN value for any make-up oil being added to the crankcase. The addition of make-up oil may be determined by means such as monitoring the oil level in the crankcase, sensing the addition of new oil through use of a flow sensor, or some other means known in the art.

In the preferred embodiment, the TBN model is a regression-based model. An exemplary equation used to determine TBN is:

$$TBN = a_0 + a_1x_1 + a_2x_2 + a_3x_3 + a_4x_1x_2 + a_5x_1x_3 + a_6x_2x_3 + a_7x_4 + a_8x_4^2 \quad \text{(Equation 5)}$$

where $a_0$–$a_8$ are empirical constants, $x_1$ is engine speed, $x_2$ is the effective wall area, $X_3$ is the intake manifold temperature, and $x_4$ is the air-to-fuel ratio.

Figure 4:
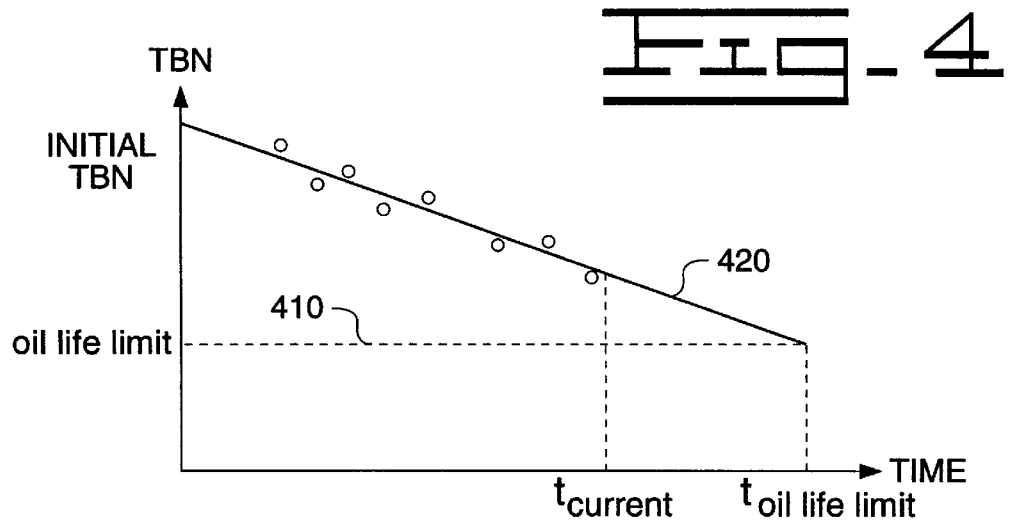
FIG. 4 is a graphical representation of a trend line predicting TBN depletion.

The TBN depletion determined from the TBN model 150 can be plotted over time, as is illustrated in FIG. 4, to predict trends in the oil condition. Using well known curve fitting techniques; a curve of TBN depletion over time 420 can be determined. This curve 420 can be extended into the future, and the intersection of the curve 420 with a predetermined oil life limit threshold 410 can be used to predict the end of useful life of the oil. Each data point determined from the TBN model 150 increases the accuracy of the curve in predicting the true end of useful life of the oil.

Figure 5:
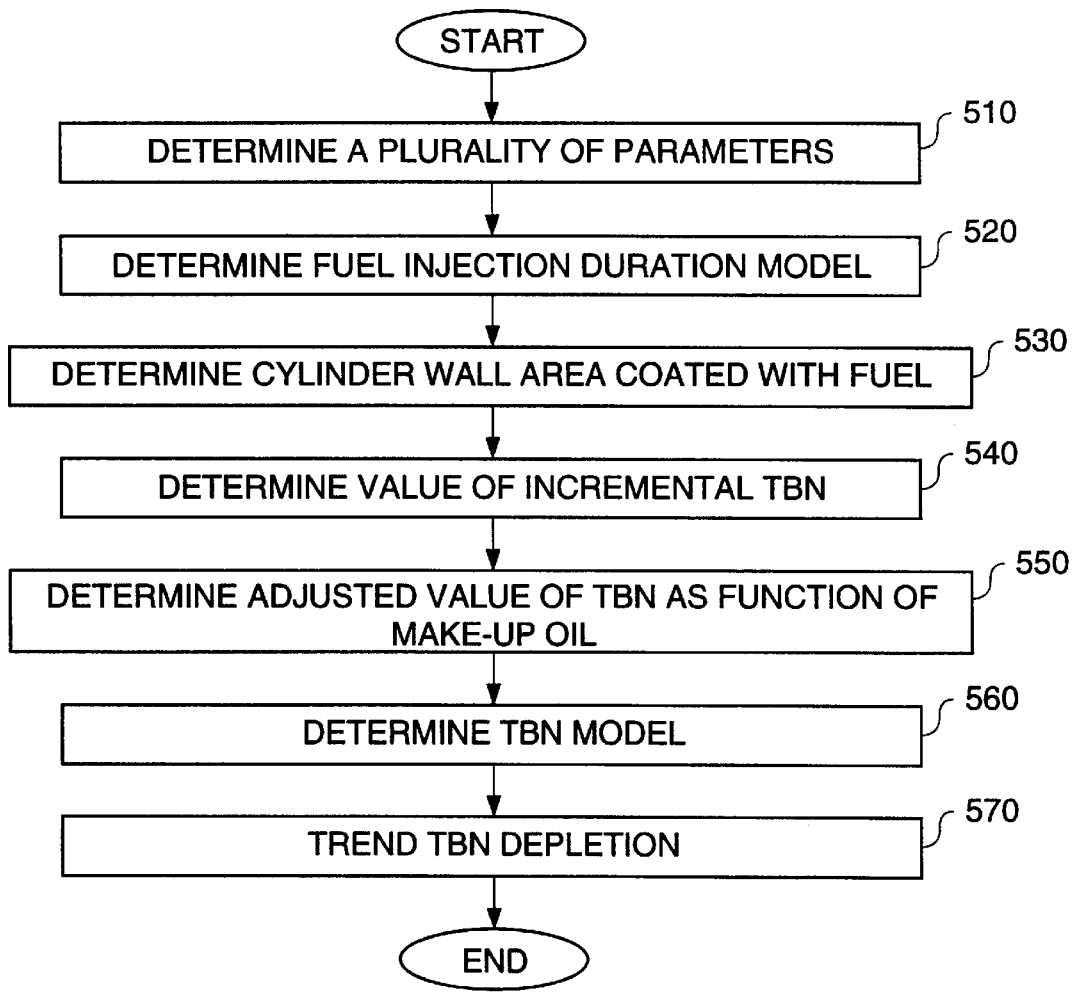
FIG. 5 is a flow diagram of a method of the present invention that estimates TBN of oil in an engine.

Referring to FIGS. 5 and 6, the operation of the present invention is depicted in flow diagrams.

A plurality of parameters is determined in a first control block 510 in FIG. 5. Examples of parameters include, but are not limited to: fuel rack position, engine speed, ambient air temperature, ambient air pressure, intake manifold temperature, boost pressure, fuel rate, and air-to-fuel ratio.

In a second control block 520, a fuel injection duration model 110 is determined. The fuel injection duration model 110 is further described in the flow diagram of FIG. 6 where, in a first control block 610, the start of injection (SOI) is determined. In a second control block 620, the end of injection (EOI) is determined. In a third control block 630, the duration of fuel injection is calculated as EOI-SOI.

Referring back to FIG. 5, in a third control block 530, the area of the cylinder wall 310 that is coated with fuel is determined. The wall area is determined in at least one of the crank model 120 and the integrator model 130, and can be determined by any one of Equations 2, 3, or 4 described above.

In a fourth control block 540, a value of incremental TBN is determined for one cycle of engine operation. In a fifth control block 550, an adjusted value of TBN as a function of the addition of make-up oil is determined. In a sixth control block 560, the TBN of the oil is determined.

In a seventh control block 570, the end of useful life of the oil is determined by plotting the values of TBN determined from the TBN model 150 over time, and trending the plot into the future.

INDUSTRIAL APPLICABILITY

As an example of an application of the present invention, several industries operate fleets of machines and vehicles using internal combustion engines as prime movers and power sources. Examples of such fleets are on-highway trucks, off road mining machines, and electric power generators.

A major maintenance cost associated with the operations of these fleets is the periodic replacement of the engine oil. Normally, these oil change intervals are scheduled based on mileage or time of use of the engines. However, scheduling oil changes in this manner does not guarantee that the oil has reached the end of its useful life. Conversely, there is no assurance that the oil has not exceeded its useful life, resulting in some measure of damage to expensive engine components. In both situations, changing engine oil in a large fleet of engines at times other than the end of life of the oil is costly.

The present invention is designed to receive a plurality of parameters associated with the operation of the engine and, through the use of modeling techniques, determine the condition of the engine oil during operation of the engine. The determination of the condition of the oil can then be trended over time to predict when the oil will reach the end of its useful life, thus allowing an operator to determine an optimal and cost-effective time to replace the oil.

In addition, the present invention can be used to initiate an oil condition alert to an operator as the oil nears the end of its useful life. This alert can be on board a machine, or may be sent to a remote location.

Other aspects, objects, and features of the present invention can be obtained from a study of the drawings, the disclosure, and the appended claims.

I claim:

1. A method for determining a condition of oil in an internal combustion engine, including the steps of:

determining a plurality of parameters associated with the engine;

determining a model of a duration of injection of fuel into a cylinder in the engine;

determining a wall area of the cylinder that is coated with fuel during injection;

determining a model of a total base number (TBN) of the oil as a function of the parameters, the fuel injection duration model, and the coated wall area; and determining a condition of the oil.

2. A method, as set forth in claim 1, wherein the wall area is determined as a function of the distance from a longitudinal axis through the center of a crankshaft to an axis through a piston pin.

3. A method, as set forth in claim 2, wherein the wall area is determined as a function of the dimensions of the coated wall of the cylinder and the engine speed.

4. A method, as set forth in claim 3, wherein the wall area is determined as a function of an integral of the coated wall area with respect to the change in angular position of the crankshaft during the injection of fuel.

5. A method, as set forth in claim 3, wherein the wall area is determined as a function of an integral of the coated wall area with respect to time during the injection of fuel.

6. A method, as set forth in claim 1, including the step of determining a value of TBN as a function of at least one occurrence of adding new engine oil.

7. A method, as set forth in claim 1, wherein the model of a duration of injection of fuel is determined as a function of a fuel rack position and the engine speed.

8. A method, as set forth in claim 7, wherein determining the model of the duration of injection of fuel includes the steps of:

determining the start of injection (SOI);

determining the end of injection (EOI); and calculating the duration of injection as the time interval from the start of injection to the end of injection (EOI-SOI).

9. A method, as set forth in claim 1, wherein a parameter is fuel rack position.

10. A method, as set forth in claim 1, wherein a parameter is engine speed.

11. A method, as set forth in claim 1, wherein a parameter is ambient air temperature.

12. A method, as set forth in claim 1, wherein a parameter is ambient air pressure.

13. A method, as set forth in claim 1, wherein a parameter is intake manifold temperature.

14. A method, as set forth in claim 1, wherein a parameter is boost pressure.

15. A method, as set forth in claim 1, wherein a parameter is fuel rate.

16. A method, as set forth in claim 1, wherein a parameter is air-to-fuel ratio.

17. A method, as set forth in claim 1, further including the step of trending a depletion of TBN determined from the TBN model to predict an end of useful life of the oil.

18. A method, as set forth in claim 17, further including the step of initiating an alert as the oil's useful life near and end.

19. A method, as set forth in claim 18, wherein the alert is delivered to an operator on board a machine driven by the engine.

20. A method, as set forth in claim 18, wherein the alert is delivered to a remote location.

21. A method for determining a condition of oil in an internal combustion engine, including the steps of:

determining a plurality of parameters associated with the engine;

determining a model of a duration of injection of fuel into a cylinder in the engine;

determining a wall area of the cylinder that is coated with fuel during injection;

determining at least one occurrence of adding new engine oil;

determining a model of a total base number (TBN) in the oil as a function of the parameters, the coated wall area, and the added new oil; and determining a condition of the oil.

22. A model for determining a condition of oil in an internal combustion engine, comprising:

a fuel injection duration model for determining a start of injection, an end of injection, and a duration of injection of fuel into a cylinder in the engine;

a crank model for receiving determined data from the fuel injection duration model, and determining an area exposed to injection of fuel in an inner wall of the cylinder; and a total base number (TBN) model for receiving the determined data from the crank model and for receiving a plurality of parameters associated with the engine, determining the TBN of the oil, and determining the condition of the oil.

23. A model, as set forth in claim 22, further comprising an integrator model for receiving data from the crank model, and determining the area exposed to injection of fuel in the inner wall of the cylinder as a function of an integral of the wall area with respect to at least one of the angular rotation of a crankshaft in the engine and the time duration of fuel injection.

24. A model, as set forth in claim 22, further comprising an air-to-fuel ratio model for receiving a plurality of parameters, and determining an air-to-fuel ratio, the air-to-fuel ratio data being delivered to the TBN model for determination of the TBN of the oil.

25. A model, as set forth in claim 24, wherein the plurality of parameters includes an intake manifold temperature, a boost pressure, an ambient air temperature, an ambient air pressure, a fuel rate, and an engine speed.

* * * * *